United States Patent [19]

Harp

[11] 3,951,808
[45] Apr. 20, 1976

[54] FILTER PRESSES

[75] Inventor: John Harp, Stoke-on-Trent, England

[73] Assignee: Edwards & Jones Limited, Stoke-on-Trent, England

[22] Filed: June 5, 1974

[21] Appl. No.: 476,370

[30] Foreign Application Priority Data
June 12, 1973 United Kingdom............ 27855/73

[52] U.S. Cl............................ 210/230; 100/115; 100/198
[51] Int. Cl.² .................... B01D 25/00; B30B 9/02
[58] Field of Search .......... 100/112, 113, 114, 115, 100/121–125, 198, 211; 210/225, 229, 230, 236

[56] References Cited
UNITED STATES PATENTS

| | | | |
|---|---|---|---|
| 3,232,435 | 2/1966 | Fismer | 100/198 X |
| 3,306,455 | 2/1967 | Fismer | 210/236 X |
| 3,360,130 | 12/1967 | Kaga | 210/225 |
| 3,754,657 | 8/1973 | Harp | 210/230 |

FOREIGN PATENTS OR APPLICATIONS 1,285,991  8/1972  United Kingdom................ 100/115

Primary Examiner—Peter Feldman
Attorney, Agent, or Firm—Alan H. Levine

[57] ABSTRACT

A filter press having at least one movable bar extending lengthwise of the press, means for imparting constant length reciprocating movements to the or each bar, a plurality of pawls spaced apart at intervals along the or each bar, the trays having projecting pins for engagement by the pawls, and a block having a flat bottom fitted pivotally on each pin and adapted to engage slidingly with a fixed side or overhead bar as the tray moves along the press.

3 Claims, 3 Drawing Figures

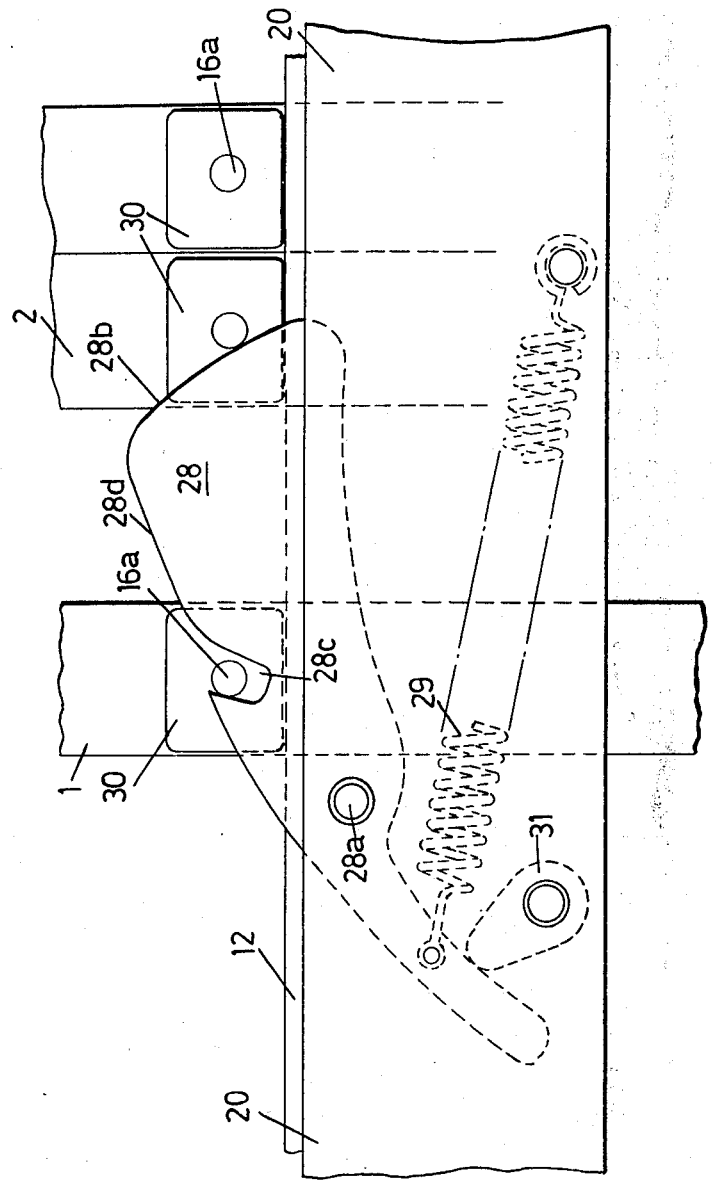

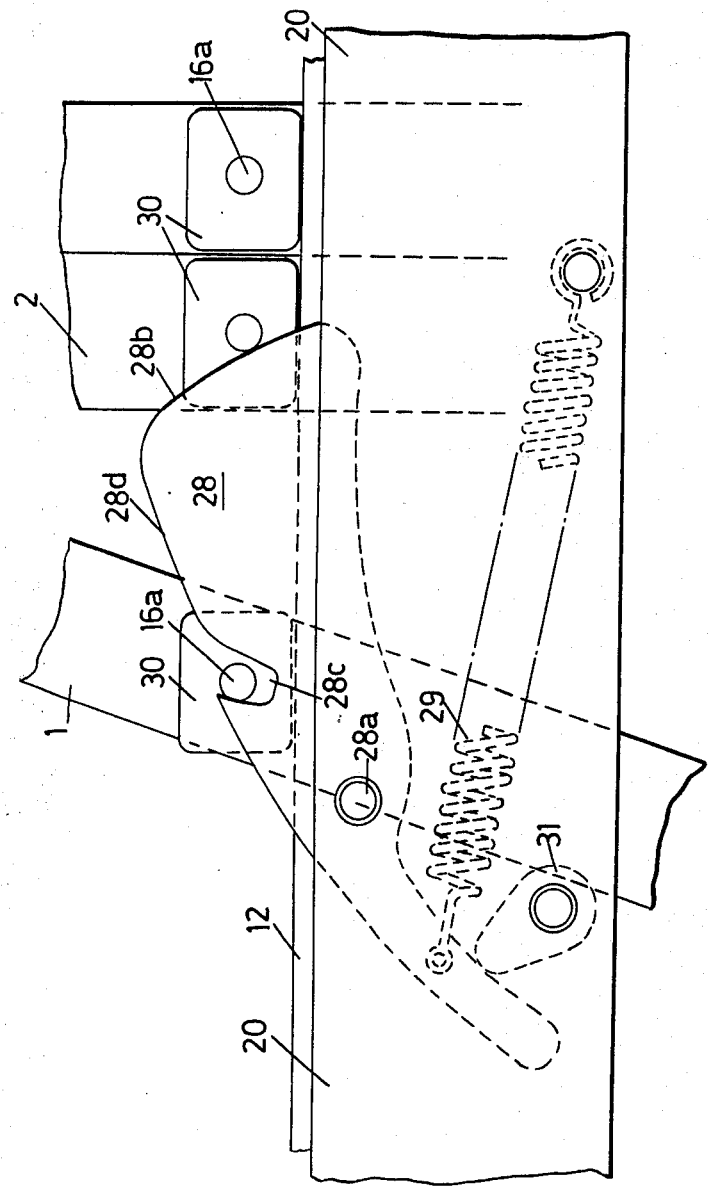

FILTER PRESSES

This invention relates to filter presses and more especially to improved means for moving filter press trays along the press, for instance to open them out at the end of a filter pressing cycle to let the filter cakes drop.

The invention is an improvement in or modification of that set forth in our prior British Patent No. 1285991 which consists in a filter press having at least one bar extending lengthwise of the press, the or each bar being mounted for non-rotary reciprocating movements parallel with the longitudinal axis of the press, means being provided for imparting constant length reciprocating movements to the or each bar during the tray-opening cycle of the filter press, the or each bar carrying a plurality of tray-engaging devices spaced apart at intervals along the or each bar, the tray-engaging devices being adapted to engage with and effect the propulsion of a single tray at each movement in the appropriate direction. There may be a reciprocating bar extending lengthwise along the press at each side of it, the tray engaging devices being paired on the two bars. Alternatively there may be a reciprocating bar or bars extending lengthwise of the press above the filter trays. The reciprocatory movements of the bar or bars may be effected mechanically, for instance by a lever and linkage arrangement, or by fluid pressure means, which latter may be either pneumatically or hydraulically operated.

In such an arrangement when a tray is moved away from the closed pack of trays towards the opposite end of the press, there is a gap left between the moved tray (assuming it to be the first of the pack to be moved) and the end plate of the press, or between the moved tray and a previously moved tray as the case may be. When the next tray of the pack is moved it acts to close this gap by pushing the already moved tray close up either to the end plate or to another tray.

According to the present invention pawls pivotally mounted on the reciprocating bar or bars successively engage the press trays, each pawl having a nose portion adapted to push against previously moved trays, the trays having projecting pins for engagement by the pawls, and a block having a flat bottom being fitted pivotally on to each pin and each block being adapted to engage slidably with the face of one of the press fixed side bars (or an overhead bar) as the tray moves along the press.

The effect of this arrangement is to ensure that although each tray is free to swing on the axis represented by its projecting pins, the blocks prevent any relative longitudinal movement between the pins and the pawls, so that the pawls cannot disengage themselves from the pins during the tray-opening movement and the nose portions of the pawls are consequently locked in position to nose the trays and close up the gap before-mentioned.

The invention will now be described, by way of example, with reference to the accompanying drawings, in which:

FIGS. 2 and 3 are side elevations showing some trays and pawls in a filter press, in a tray-opening sequence, drawn to a larger scale than FIG. 1, and incorporating certain improvements to be described.

Figure 1:
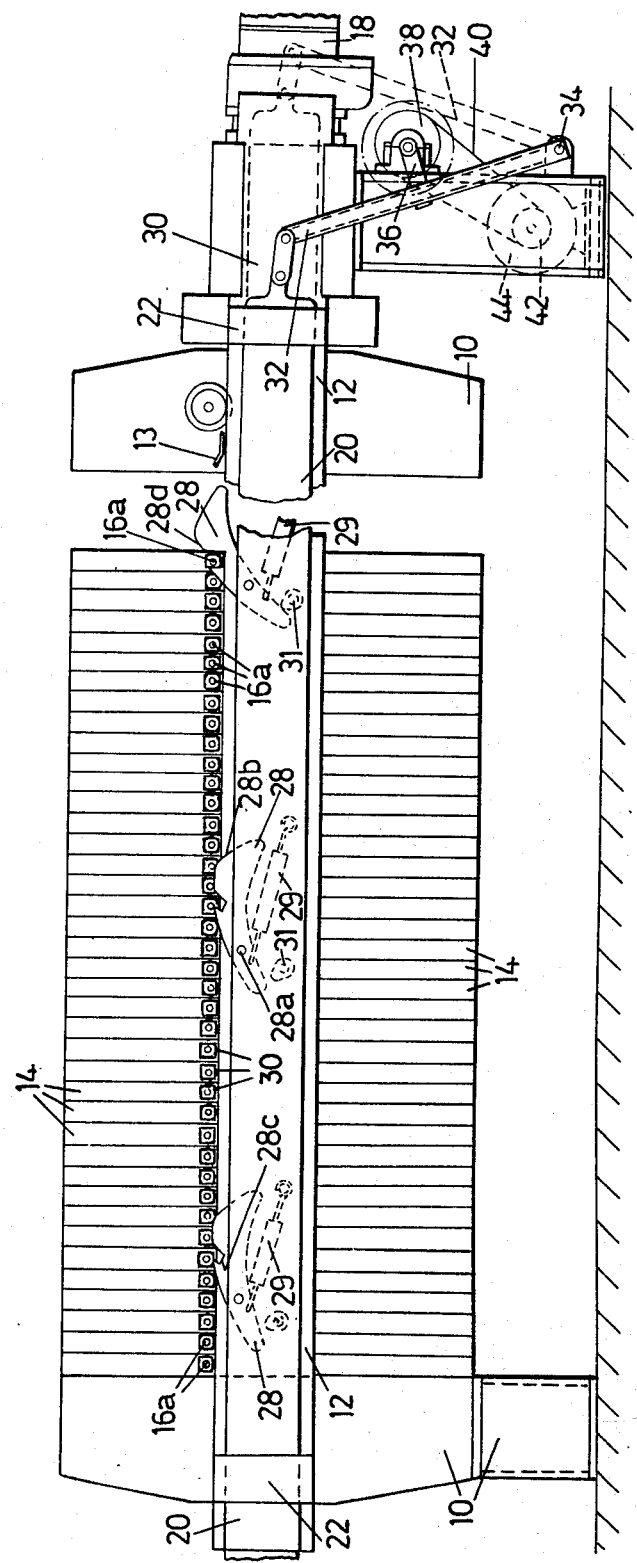
FIG. 1 is a side elevation of a filter press.

Referring to FIG. 1 the filter press comprises end plates 10 and side girders 12 on which the filter press trays 14 are supported on pins 16a. Closing gear for closing the press trays 14 together is indicated at 18. Two horizontal reciprocating bars are provided, one at each side of the press, one being seen at 20, slidably mounted in guides 22 attached to the girders 12. Pawls 28 are mounted on pivots 28a on the bar 20. Each pawl has a nose portion 28b, a recess 28c in its upper edge and an intermediate contour or flat portion 28d between the nose and the recess. A tension spring 29 is connected between each pawl 28 and the bar 20. The pawls therefore tend to assume the position shown at the right of FIG. 1, where the pawl has risen up to a limit imposed by a stop 31 and its recess 28c has engaged with the pin 16a on the first of the press trays 14; the pawl will carry the tray to the right until the nose of the pawl rides under a cam or profile member 13, mounted on the end plate 10 which deflects the pawl as the sliding movement of the bar 20 continues. The said first tray is therefore moved close up to the end plate 10, and the bar 20 having reached the limit of its reciprocating movement to the right, begins its return movement to the left. The pawl now leaves the first tray behind and presently moves under the pin 16a of the next tray: this is presently, when the bar 20 again moves to the right, engaged and likewise moved close up alongside the first tray. It will be seen that as a pawl begins its return movement to the left the pin 16a will ride out of the recess 28c in the pawl. Pawls are spaced at equal intervals along the bar 20 so that each pawl operates a suitable number of the trays as the trays are successively opened up. The spacing apart of the pawls is less than the constant-length reciprocating movements of the bar. Obviously the said reciprocating movements can be contrived in various ways but as illustrated in FIG. 1 they are effected by a link 30 connected to a lever 32 working on a pivot 34, the alternative position of the lever being indicated in dotted lines. The lever is actuated by a link 36 from a driving pulley or sprocket 38 operated by a V-belt or chain 40 from another pulley or sprocket 42 driven by a motor 44.

As indicated in FIGS. 2 and 3, the trays 14 tend to swing on the pins 16a and in the opening movement (to the right) of the trays the pins may move away from the face of the recess 28c; when the nose of a pawl encounters the pin on a previously moved tray the nose would tend to dip under the said pin instead of nosing the tray close up to the previously moved tray. Consequently in the opening sequence the gap between the opened trays may not be completely closed and tight stacking of the opened trays could fail to be achieved. To avoid this possibility each tray pin 16a has fitted on to it a block 30, the block being freely mounted on the pin. The blocks have flat bottom faces so that they can move slidably along the upper surfaces of the fixed side bars of the press. The trays are free to swing as before since the pins can turn in the blocks, but the pins will not move away from the faces of the recesses 28c during the opening movement. Thus, it will be seen that there is no relative movement between the pins and the pawls. When the nose of the pawl which is moving tray 1 strikes the pin on tray 2 the nose of the pawl will not dip down as before, because the resisting force on the pawl is maintained between the recess engaged by the pin on tray 1 and the nose of the pawl which is of the appropriate curvature for engagement by the pin on tray 2. The presence of the blocks as they slide along the side bars also gives additional friction on the side bars and this is useful in ensuring that the suction effect between adjoining trays is broken and consequently ensuring that only one tray at a time will be opened.

Various modifications may be made within the scope of the invention. For example instead of having two reciprocating bars, one at each side of the press, for effecting the movements of the filter trays the invention can equally well be applied to presses of the overhead girder type and in such cases a single overhead reciprocating bar can be used.

I claim:

1. A filter press having trays furnished with projecting pins, a fixed bar and a movable bar extending lengthwise of the press, means mounting the movable bar for non-rotary reciprocating movements parallel to the longitudinal axis of the press, means for imparting constant length reciprocating movements to the movable bar during the tray-opening cycle of the filter press, a plurality of pawls pivotally mounted on the movable bar at spaced-apart points along the bar, each pawl successively engaging press tray pins to effect the propulsion of a single tray at each movement of the movable bar in the appropriate direction, each pawl having a nose portion adapted to push against the pins of previously moved trays, and a block pivotally supporting each tray pin, said block having a flat bottom slidably engaging the fixed bar as its respective tray moves longitudinally of the press.

2. A filter press as defined in claim 1 including means for pivoting said pawls into tray pin-engaging positions but permitting said pawls to be deflected downwardly clear of said pins so that the pawls can move under the pins, the spacing between said pawls being less than the length of the stroke of the movable bar during its reciprocating movements, during each reciprocating movements of the movable bar in the forward direction the pawls being carried in the direction of the filter trays awaiting movement and in the reverse direction each pawl engaging the pin of a first tray and moving it away from the other trays, each pawl disengaging the pin of the tray which it has just moved upon the next movement of the movable bar in the forward direction.

3. A filter press as defined in claim 1 wherein each pawl has a recess in its upper edge, and including a spring tending to raise the nose portion of each pawl so as to bring the recess into engagement with a tray pin preparatory to moving that tray away from the other trays.

* * * * *